(12) United States Patent
Scheuring et al.

(10) Patent No.: US 10,100,568 B2
(45) Date of Patent: Oct. 16, 2018

(54) ELECTROMECHANICAL STRUT WITH LATERAL SUPPORT FEATURE

(71) Applicant: Magna Closures Inc., Newmarket (CA)

(72) Inventors: Joseph Scheuring, Richmond Hill (CA); Wieslaw Nowicki, Mississauga (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 15/215,679

(22) Filed: Jul. 21, 2016

(65) Prior Publication Data

US 2017/0044814 A1 Feb. 16, 2017

Related U.S. Application Data

(60) Provisional application No. 62/204,154, filed on Aug. 12, 2015.

(51) Int. Cl.
*E05F 15/622* (2015.01)
*B60J 5/10* (2006.01)
*H02K 7/116* (2006.01)

(52) U.S. Cl.
CPC ............ *E05F 15/622* (2015.01); *B60J 5/106* (2013.01); *H02K 7/116* (2013.01); *E05Y 2201/434* (2013.01); *E05Y 2900/532* (2013.01); *E05Y 2900/548* (2013.01)

(58) Field of Classification Search
CPC ................. E05F 15/622; E05F 1/1058; E05Y 2900/546; E05Y 2900/548; E05Y 2201/434; B60J 5/101
See application file for complete search history.

(56) References Cited

U.S. PATENT DOCUMENTS

| 4,921,225 | A | * | 5/1990 | Ludwig | E05F 1/1292 |
| | | | | | 188/269 |
| 6,158,295 | A | | 12/2000 | Nielsen | |
| 6,256,928 | B1 | * | 7/2001 | Skeem | E05F 15/622 |
| | | | | | 49/340 |
| 6,516,567 | B1 | * | 2/2003 | Stone | E05F 15/622 |
| | | | | | 296/55 |
| 7,234,757 | B2 | | 6/2007 | Mitchell | |
| 7,487,709 | B2 | | 2/2009 | Muller et al. | |

(Continued)

FOREIGN PATENT DOCUMENTS

DE 102013003830 * 9/2014

*Primary Examiner* — Justin B Rephann
(74) *Attorney, Agent, or Firm* — Dickinson Wright PLLC

(57) ABSTRACT

An electromechanical strut for moving a closure member between open and closed positions relative to a vehicle body includes a housing having an inner surface bounding a cavity extending along a central axis between opposite first and second ends. A power screw is disposed in the cavity in operable communication with a motor, with a gear assembly operably connecting the motor to the power screw. An extensible member has an outer cover tube received in the housing cavity and a drive mechanism for converting rotary motion of the power screw into linear motion of the extensible member. An annular gap extends between the inner surface of the housing and an outer surface of the outer cover tube. An annular bushing is disposed within the annular gap to minimize laterally play between the housing and the outer cover tube.

20 Claims, 6 Drawing Sheets

(56) References Cited

U.S. PATENT DOCUMENTS

| | | | |
|---|---|---|---|
| 7,566,092 B2 | 7/2009 | Paton et al. | |
| 7,938,473 B2 | 5/2011 | Paton et al. | |
| 8,375,814 B2 | 2/2013 | Hillen et al. | |
| 8,601,891 B2 | 12/2013 | Bochen et al. | |
| 9,021,905 B2 | 5/2015 | Reif | |
| 9,103,373 B1 | 8/2015 | Kolar et al. | |
| 9,605,735 B2 * | 3/2017 | Missler | F16H 25/20 |
| 2006/0082188 A1 * | 4/2006 | Mitchell | E05F 1/1008 296/146.8 |
| 2007/0194599 A1 * | 8/2007 | Paton | E05F 15/622 296/146.4 |
| 2007/0261310 A1 * | 11/2007 | Porat | E05F 1/1091 49/340 |
| 2008/0250720 A1 * | 10/2008 | Oxley | E05F 15/646 49/358 |
| 2009/0044645 A1 * | 2/2009 | Buescher | E05F 15/622 74/89 |
| 2009/0120003 A1 * | 5/2009 | Bochen | B60J 5/102 49/340 |
| 2014/0000394 A1 * | 1/2014 | Anheier | F16H 25/20 74/89.29 |
| 2015/0069869 A1 * | 3/2015 | Loeffler | E05F 1/1041 310/80 |
| 2016/0040766 A1 | 2/2016 | Liu et al. | |
| 2016/0144694 A1 | 5/2016 | Shchokin et al. | |
| 2016/0153532 A1 * | 6/2016 | Fischer | F16H 25/20 74/89.35 |

* cited by examiner

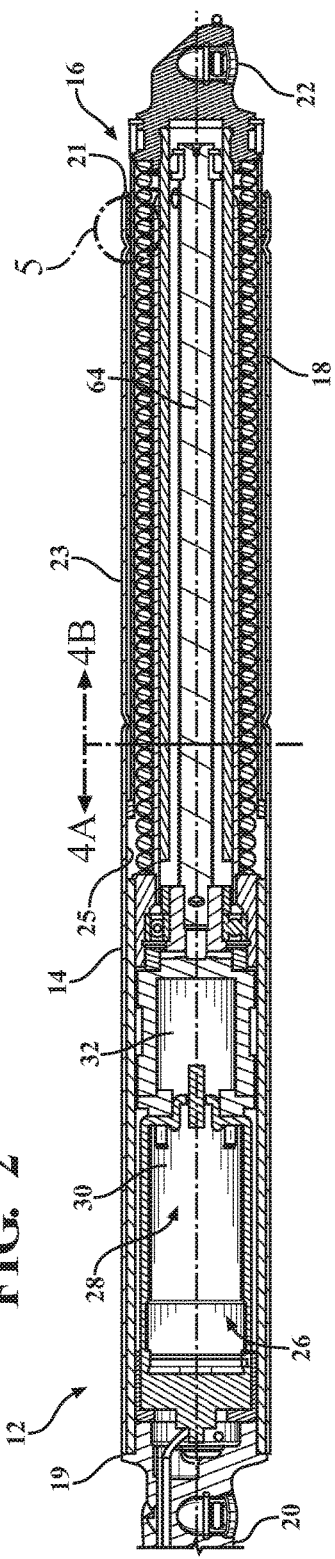
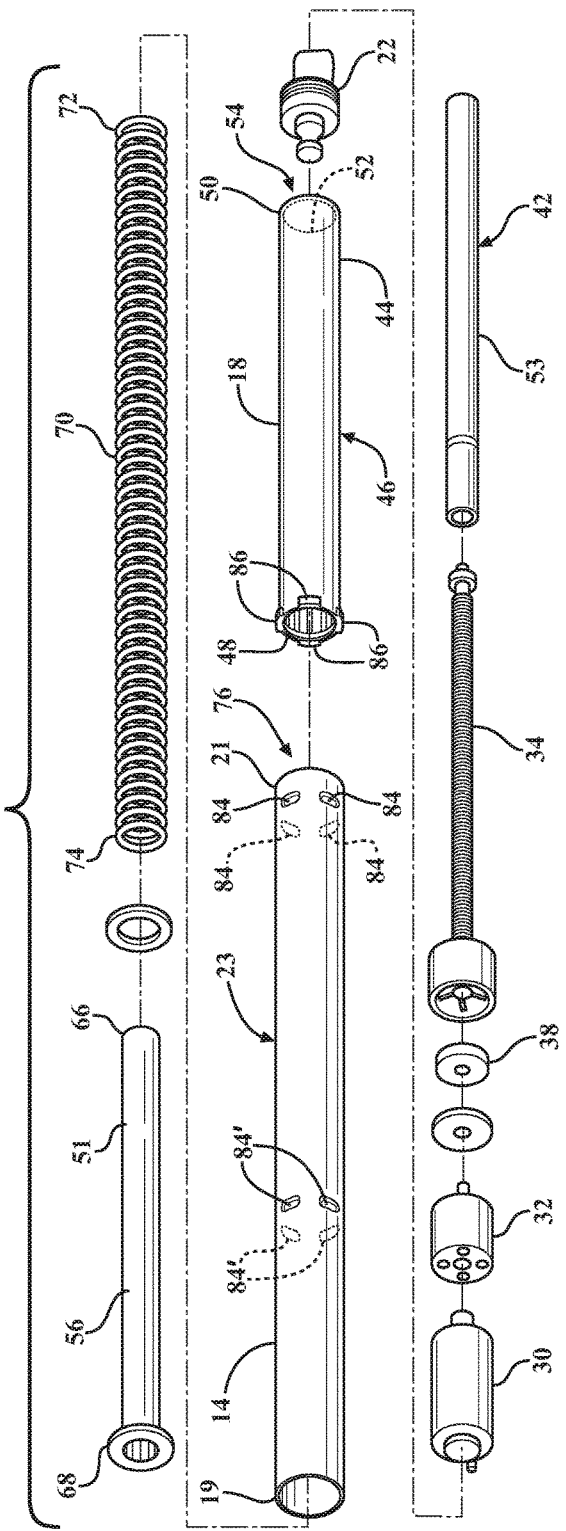

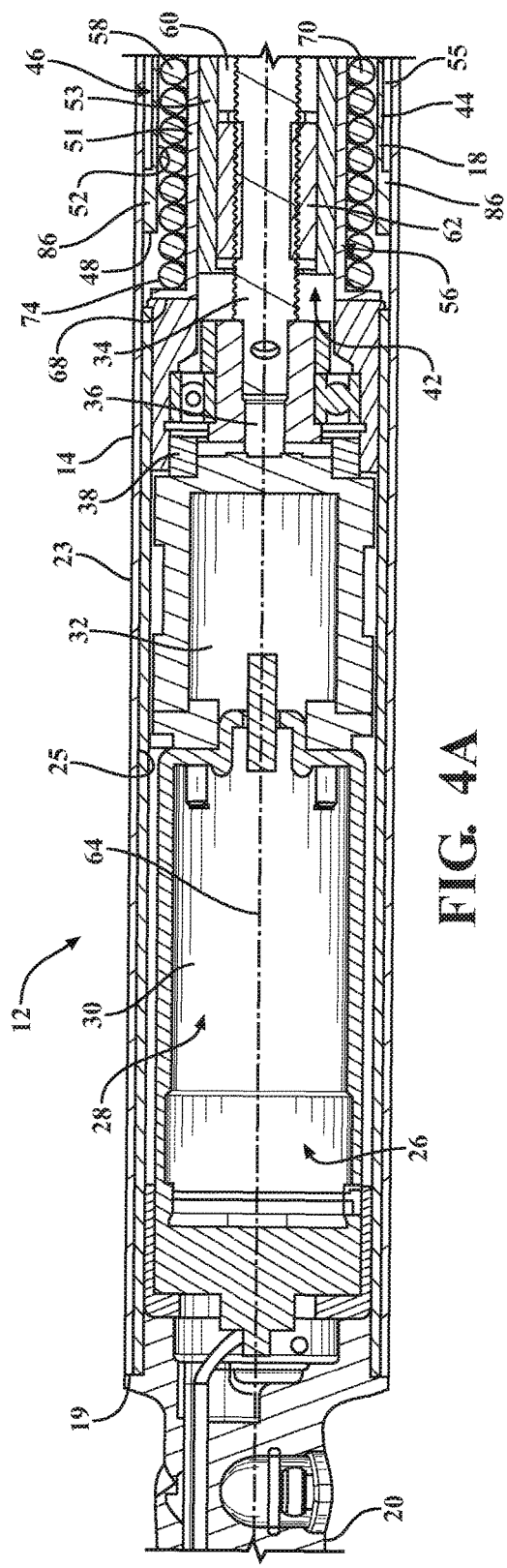
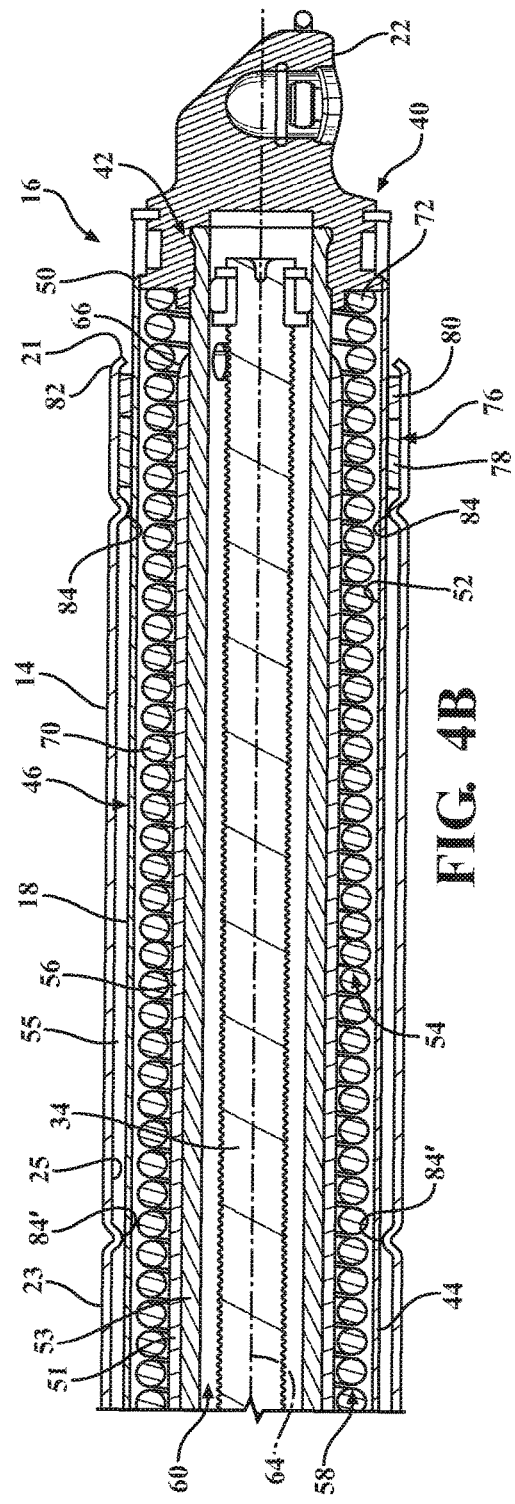
FIG. 4A
FIG. 4B

ELECTROMECHANICAL STRUT WITH LATERAL SUPPORT FEATURE

CROSS-REFERENCE TO RELATED APPLICATION

This application claims the benefit of U.S. Provisional Application Ser. No. 62/204,154, filed Aug. 12, 2015, which is incorporated herein by reference in its entirety.

FIELD OF THE INVENTION

The present disclosure relates generally to an electrically-driven mechanical strut, and more particularly, to an electromechanical strut used to open and/or close automotive closure member.

BACKGROUND OF THE INVENTION

This section provides background information which is not necessarily prior art to the inventive concepts associated with the present disclosure.

Automotive closure members, such as lift gates in general, provide a convenient access to the cargo areas of automotive vehicles, such as hatchbacks, wagons, and other utility vehicles. Typically, the lift gate is hand operated, requiring manual effort to move the lift gate between open and the closed positions. Depending on the size and weight of the lift gate, the effort required to move the lift gate between open and closed positions can be difficult for some users. Additionally, manually opening and/or closing a lift gate can be made inconvenient, particularly when the user's hands are occupied.

Attempts have been made to facilitate opening and closing lift gates, such as via electromechanical struts. Electromechanical struts typically have a linear actuation assembly including a lead screw and a nut tube, with rotation of the lead screw causing linear translation of the nut tube, which in turn is operably attached the lift gate. Accordingly, rotation of the lead screw causes the lift gate to be moved between open and closed positions. Although these devices generally prove useful in reducing the effort required by the user to move the lift gate between open and closed positions, the devices can be subject to the ingress of contamination, and further yet, can exhibit lateral play and undue friction between linearly translatable components, thereby subjecting the devices to unwanted corrosion and wear, which can result in a diminished useful life of the device, while also resulting in undesirable noise and an overall perception of poor quality.

It is therefore desired to provide an electromechanical strut for opening and closing a vehicle trunk lid, door or lift gate that obviates or mitigates at least one of the above-identified disadvantages.

SUMMARY OF THE INVENTION

This section provides a general summary of the disclosure and is not intended to be a comprehensive disclosure of its full scope or all of its features, aspects or objectives.

It is one aspect of the present disclosure to provide an electromechanical strut for use in a powered closure system in a motor vehicle for controlling movement of a closure member between an open position and a closed position.

It is a related aspect of the present disclosure to provide an electromechanical strut for use in a power lift gate system of a motor vehicle.

In accordance with these and other aspects of the present disclosure, an electromechanical strut is provided for moving a closure panel relative to a motor vehicle body between a closed position and an open position.

In accordance with one aspect of the present disclosure, an electromechanical strut is provided for moving a closure member between an open position and a closed position relative to a motor vehicle body. The electromechanical strut includes a housing operably connected to one of the closure member or motor vehicle body. The housing has a tubular wall with an inner surface bounding a cavity extending along a central axis between opposite first and second ends. A motor is operably attached to the housing adjacent the first end and a power screw is disposed in the cavity, with a motor gear-assembly operably connecting the motor to the power screw for operable rotation of the power screw. An extensible member is operably connected to the other of the closure member or the motor vehicle body. The extensible member has an outer cover tube at least partially received in the cavity through the second end of the housing. The extensible member has a drive mechanism for converting rotary motion of the power screw into linear motion of the extensible member to move the extensible member between retracted and extended positions relative to the housing. An annular gap is defined between the inner surface of the housing and an outer surface of the outer cover tube. An annular bushing is disposed within the annular gap, with the bushing reducing dynamic sliding friction, maintaining the gap and minimizing lateral play between the housing and the outer cover tube.

In accordance with another aspect of the present disclosure, the electromechanical strut housing can further include at least one feature extending radially inwardly toward the central axis proximate its second end and at least one distal rib extending radially inwardly toward the central axis adjacent the at least one feature, with the bushing being captured against substantial axial movement relative to the housing between the at least one feature and the at least one distal rib.

In accordance with another aspect of the present disclosure, the electromechanical strut can further include an annular seal disposed within the annular gap, with the seal being captured between the at least one feature and the bushing to inhibit the ingress of contamination.

In accordance with another aspect of the present disclosure, the at least one feature can be formed by a radially inwardly tapered region of the second end of the housing.

In accordance with another aspect of the present disclosure, the at least one distal rib can be formed by a radially inwardly, plastically deformed indentation in the tubular wall of the housing.

In accordance with another aspect of the present disclosure, the bushing and the seal can be formed of different types of materials, thereby optimizing the functionality of each.

In accordance with another aspect of the present disclosure, the outer cover tube of the extensible member can include at least one protrusion extending radially outwardly from its outer surface, with the at least one protrusion being configured in a close fit with the inner surface of the tubular wall of the housing to inhibit lateral play between the housing and the outer cover tube.

In accordance with another aspect of the present disclosure, the at least one protrusion can be molded as a monolithic piece of material with the outer cover tube.

In accordance with another aspect of the present disclosure, the at least one protrusion can include a plurality of protrusions and the at least one distal rib can include a plurality of distal ribs, wherein the plurality of protrusions are spaced circumferentially from one another and the plurality of distal ribs are substantially coplanar along a plane extending generally transversely to the central axis and spaced circumferentially from one another, with the protrusions and the distal ribs being configured to slide axially past one another, and wherein the plurality of protrusions and the plurality of distal ribs extend radially outwardly and inwardly, respectively, beyond one another.

In accordance with another aspect of the present disclosure, the electromechanical strut housing can further include a plurality of proximal ribs spaced axially from said distal ribs, said proximal ribs being substantially coplanar along a plane extending generally transversely to the central axis and spaced circumferentially from one another, with the protrusions and the proximal ribs being configured to slide axially past one another, and wherein the plurality of protrusions and the plurality of proximal ribs extend radially outwardly and inwardly, respectively, beyond one another.

These and other alternative embodiments are directed to providing an electromechanical strut for use in a powered closure system of a motor vehicle.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention will now be described, by way of example only, with reference to the attached Figures, wherein:

FIG. 2 is a cross-sectional view of one of the electromechanical struts shown in FIG. 1 constructed in accordance with one aspect of the present disclosure and shown in a retracted position;

FIG. 3 is an exploded view of the electromechanical strut of FIG. 2;

FIG. 4A is an enlarged partial cross-sectional view of the electromechanical strut of FIG. 2 showing a portion indicated generally by arrow 4A in FIG. 2;

FIG. 4B is an enlarged partial cross-sectional view of the electromechanical strut of FIG. 2 showing a portion indicated generally by arrow 4B in FIG. 2.

DETAILED DESCRIPTION OF THE INVENTION

Vehicles, such as passenger vehicles, are generally equipped with numerous moveable closure members or panels for providing openings and access within and through various defined portions of the vehicle. To enhance operator convenience, many vehicles are now equipped with power-operated closure systems to automatically control movement of all types of closure panels including, without limitation, hatch lift gates, trunk and hood deck lids, sliding and hinged doors, sun roofs and the like. The powered mechanical advantage is often provided by an electromechanical drive device including, without limitation, motor driven gear drives, cable drives, chain drives, belt drives and power screw drives. Current development focus is largely directed to improving these popular systems through weight and part count reduction, packaging efficiency, system noise, back drive effort, useful life, cost and ease of assembly and service repair. Accordingly, the present disclosure addresses all of these issues.

For purposes of descriptive clarity, the present disclosure is described herein in the context of one or more specific vehicular applications, namely powered lift gate and deck lid systems. However, upon reading the following detailed description in conjunction with the appended drawings, it will be clear that the inventive concepts of the present disclosure can be applied to numerous other systems and applications. In this regard, the present disclosure is generally directed to electromechanical struts having a power-operated drive mechanism comprised of a housing, an electric motor, a reduction gearset driven by the electric motor, a rotatable power screw of a threaded spindle assembly, a coupling device that is operably disposed between the gearset and the power screw, an extensible member that is linearly translatable relative to a central axis of the housing, a bushing/seal assembly disposed between the housing and an outer cover tube of the extensible member, and further including guide features/protrusions that position and maintain lateral stability of the outer cover tube within the housing. The bushing/seal assembly and guide features/protrusions combine to extend the useful life of the struts by inhibiting the ingress of contamination, reducing dynamic friction and further providing a perceived quality enhancement by reducing noise and lateral play between the housing and the outer support tube.

Figure 1:
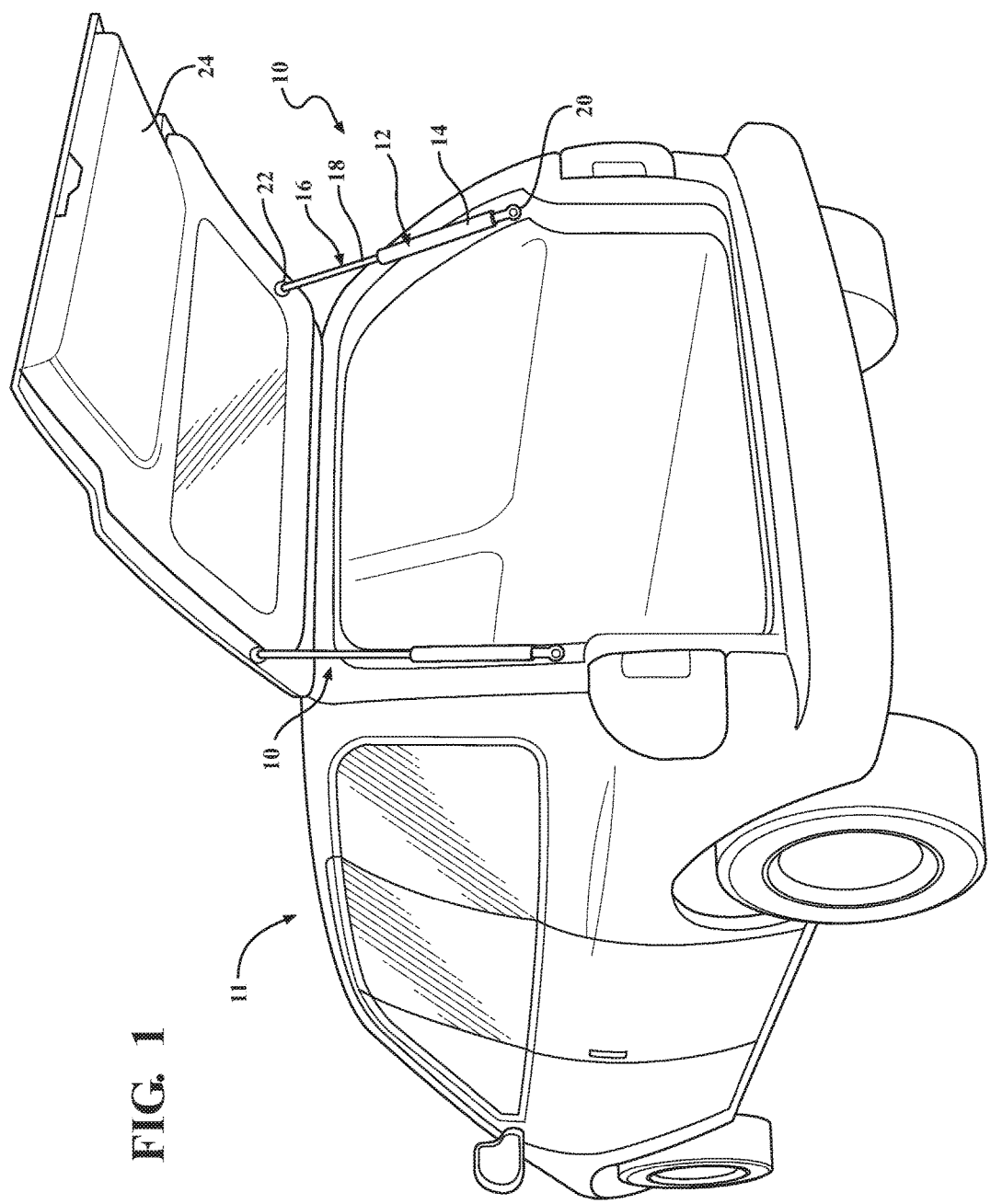
FIG. 1 is an isometric view of a motor vehicle having a powered lift gate system equipped with a pair of electromechanical struts, at least one of which is constructed in accordance with the teachings of the present disclosure.

Referring now to FIG. 1, an embodiment of an electromechanical strut 10 is shown mounted to a motor vehicle 11. Electromechanical strut 10 includes a power drive unit 12 enveloped in an upper housing or tube, referred to hereafter simply as housing 14, and a telescoping unit 16, enveloped in an outer lower housing or cover tube, referred to hereafter as outer cover tube 18. A first pivot mount 20, located at an end of housing 12, is pivotally mounted to a portion of the vehicle body that defines a portion of an interior cargo area in the vehicle 11. A second pivot mount 22 is attached to the distal end of telescoping unit 16 and is pivotally mounted to a lift gate 24 of the vehicle 11.

FIG. 2 shows a cross-sectional view of the electromechanical strut 10, shown as having a modular design, by way of example and without limitation. Electromechanical strut 10 comprises the two main, separable, units: the power drive unit 12 and the telescoping unit 16, which are shown respectively in isolation in the fragmentary axonometric views of FIG. 4A and FIG. 4B. Power drive unit 12 is sized and rated to function as a drive unit for a variety of closure panels associated with different vehicles. Telescoping unit 16 may be sized, as required, for each unique vehicle model to achieve a desired telescoping travel length.

Power drive unit 12 has the tubular housing 14 with an outer surface 23 that extends between opposing first 19 and second 21 ends and an inner surface 25 defining a cavity or chamber 26 sized for at least partial receipt of a motor-gear assembly 28 therein. Motor-gear assembly 28 includes a motor 30, a planetary gearset 32 and a power screw 34. Motor 30 and planetary gearset 32 are seated within chamber 26. Power screw 34 is disposed and seated for rotation in telescoping unit 16 and couples to power unit output shaft 36 (FIG. 4A). In the illustrated embodiment, planetary gearset 32, which is known in the art per se, provides about a 20:1 gear ratio reduction. Power drive unit 12 features a coupling, such as an elastomeric coupling 38, that enable power unit 12 to be quickly and easily attached with telescoping unit 16.

Telescoping unit 16 has an extensible member 40 which comprises the outer cover tube 18, also referred to as guide tube or tubular casing, and a tubular nut-shaft assembly 42, which are rigidly fixed to one another for conjoint axial movement via an end cap, which is shown as forming the second pivot mount 22. Extensible member 40 is movable between a retracted position, generally corresponding to a closed position of lift gate 24, and an extended position, generally corresponding to an open position of the lift gate 24.

Outer cover tube 18 has a cylindrical wall 44 with an outer surface 46 that extends between opposing first 48 and second 50 ends and an inner surface 52 that bounds a chamber 54. The outer surface 46 is spaced radially inwardly from the inner surface 25 of the housing 14 by an annular gap 55. First end 48 of cylindrical wall 44 is open and the second end 50 of cylindrical wall 44 is closed off by second pivot mount 22. Preferably, second pivot mount 22 can be secured to the second end 50 via any suitable fixing mechanism, such as a snap ring, by way of example and without limitation. The inner surface 52 can be formed having axially extending, radially spaced (indexed) ribs, also referred to as flanges 57, wherein the flanges 57 provided skids that function to reduce friction and radial or lateral play between an outer support tube 51 of the tubular nut assembly 42 and the cover tube 18.

Tubular nut-shaft assembly 42 includes the outer support tube 51 disposed concentrically about a radially inner tube 53. The outer support tube 51 has a cylindrical wall 56 spaced radially inwardly from inner surface 52 of the cylindrical wall 44 of outer cover tube 18. One end of cylindrical inner tube 53 is fixedly connected to second pivot mount 22, such as via mating helical threads for interconnecting the parts, without limitation. Cylindrical wall 44 of outer cover tube 18 and cylindrical wall 51 of tubular nut-shaft assembly 42 define a toroidal chamber 58 therebetween. One end of toroidal chamber 58 is closed off by second pivot mount 22 and an opposing end of toroidal chamber 58 is open. Cylindrical inner tube 53 of tubular nut-shaft assembly 42 further defines a central cylindrical chamber 60 radially inwardly of toroidal chamber 58, wherein the cylindrical chamber 60 is sized for clearance receipt of power screw 34.

A drive nut 62 is rigidly mounted in cylindrical chamber 60 of inner tube 53, such as via press fit, riveted connection, adhesive, combination thereof, or otherwise. Drive nut 62 is threadedly coupled with power screw 34 in order to convert the rotational movement of power screw 34 into linear motion of drive nut 62 and extensible member 40 operably fixed thereto along a longitudinal central axis 64 of the strut 10.

In the present embodiment, the elongate, stationary outer support tube 51 has an open end 66 distal to power unit 12 and an opposing end 68 proximate to and fixedly connected to power unit 12. Stationary support tube 51 can be considered to form part of the housing, which connects one end of the strut 10 to the lift gate (or vehicle body), with the extensible member 40 connecting the other end of the strut 10 the vehicle body (or lift gate). Stationary support tube 51 fits closely over inner tube 53, thereby minimizing lateral play therebetween, but does not extend or translate linearly with the extensible member 40, but rather slides relative thereto.

A power spring 70 is seated within toroidal chamber 58, between stationary outer support tube 51 and cylindrical wall 44 of outer cover tube 18. Power spring 70 is a coil spring that uncoils (extends axially) and recoils (contracts axially) as extensible member 40 translates relative to stationary outer support tube 51 and power unit 12. The annular spacing between stationary outer support tube 51 and outer cover tube 18 is sized to closely fit the preferred toroidal form of power spring 70, wherein the flanges 57 facilitate forming the close fit to reduce lateral play and to reduce friction and noise between the spring 70 and the inner surface 52 of the cover tube 18. One end 72 of spring 70 is connected to and/or abutted against the second pivot mount 22 of extensible member 40 and another end 74 of spring 70 is connected to and/or abutted against end 68 of stationary outer support tube 51 proximate to, and ultimately supported by, power unit 12. It should be appreciated that in the present embodiment, power spring 70 is guided and supported against buckling along its entire length of travel by the combined action of stationary outer support tube 51 which guides the inside edge of power spring 70 and inner surface 52 of cover tube 18 which guides the outer edge of power spring 70. In the preferred embodiment, when extensible member 40 is at its fully extended position, stationary outer support tube 51 and outer cover tube 18 overlap one another or are co-extensive with one another, thus inhibiting the tendency of power spring 70 to buckle.

To facilitate the prevention of the ingress of contamination, such as dust, dirt, debris, and to further provide smooth operation of the strut 10, including minimizing lateral play and noise generation between the power drive unit 12 and the extensible member 40, a bushing/seal assembly 76 is disposed in the annular gap 55 between the housing 14 and the outer cover tube 18. The bushing/seal assembly 76 includes a first lateral support feature in the form of an annular bushing 78 and a separate annular seal 80 disposed in abutting, side-by-side relation with one another. The bushing 78 is preferably formed of a lubricious polymeric material, such as polytetrafluoroethylene (PTFE) or nylon, by way of example and without limitation. The seal 80 is preferably formed of an elastomeric material, such as a rubber-based material, by way of example and without limitation.

The bushing/seal assembly 76 is captured against axial movement relative to the housing 14 by a feature 82 extending radially inwardly toward the central axis 64 proximal the second end 21, and shown as being formed by the second end 21 of the housing 14, and at least one first rib 84 extending radially inwardly from the housing 14 toward the central axis 64 adjacent and axially spaced from the feature 82. The bushing 78 is shown as being in abutting or substantially abutting relation with the first rib 84, while the seal 80 is shown as being in abutting or substantially abutting relation with the feature 82. The feature 82 is shown as being formed by the second end 21 of the housing, wherein the second end 21 is curled radially inwardly in a crimping or roll forming operation, by way of example and without limitation. Accordingly, the feature 82 extends radially inwardly in tapered fashion about the entirety of the circumference of the housing 14 to retain the bushing/seal assembly 76 against inadvertent removal. With the second end 21 being curled inwardly, the housing 14 has an aesthetically pleasing low profile finished appearance, with no separate retaining component or increased diameter being provided thereby. As such, the strut 10 maintains a pleasing, small envelop appearance. The at least one first rib 84 is shown as being provided as a first set of a plurality of ribs, referred to hereafter as first ribs 84, wherein the first ribs 84 are substantially coplanar with one another along a plane extending transversely to the central axis 64, and spaced equidistantly in circumferential relation from one another about the circumference of the housing 14. In the embodiment shown, four first ribs 84 are present, and thus, the first ribs 84 are spaced about 90 degrees from one another, without limitation. The first ribs 84 are formed as plastically upset indentations in the wall of the housing 14, wherein the housing 14 is formed of a metal tube, and thus, no additional components are needed.

To further yet inhibit lateral movement between the housing 14 and the outer cover tube 18, additional lateral support features in the form of a second set of a plurality of ribs, referred to hereafter as second ribs 84', are shown along a mid-section of the housing 14, wherein the second ribs 84' are sized and spaced in axially mirrored relation from the first ribs 84. The ribs 84' are also substantially coplanar with one another along a plane extending transversely to the central axis 64, and spaced circumferentially from one another about 90 degrees from one another about the circumference of the housing 14, and extend radially inwardly into close proximity or close abutment with the outer surface 46 of the outer cover tube 18, as do the first ribs 84, to inhibit lateral play between the housing 14 and the outer cover tube 18.

Figures 3A, 3B:
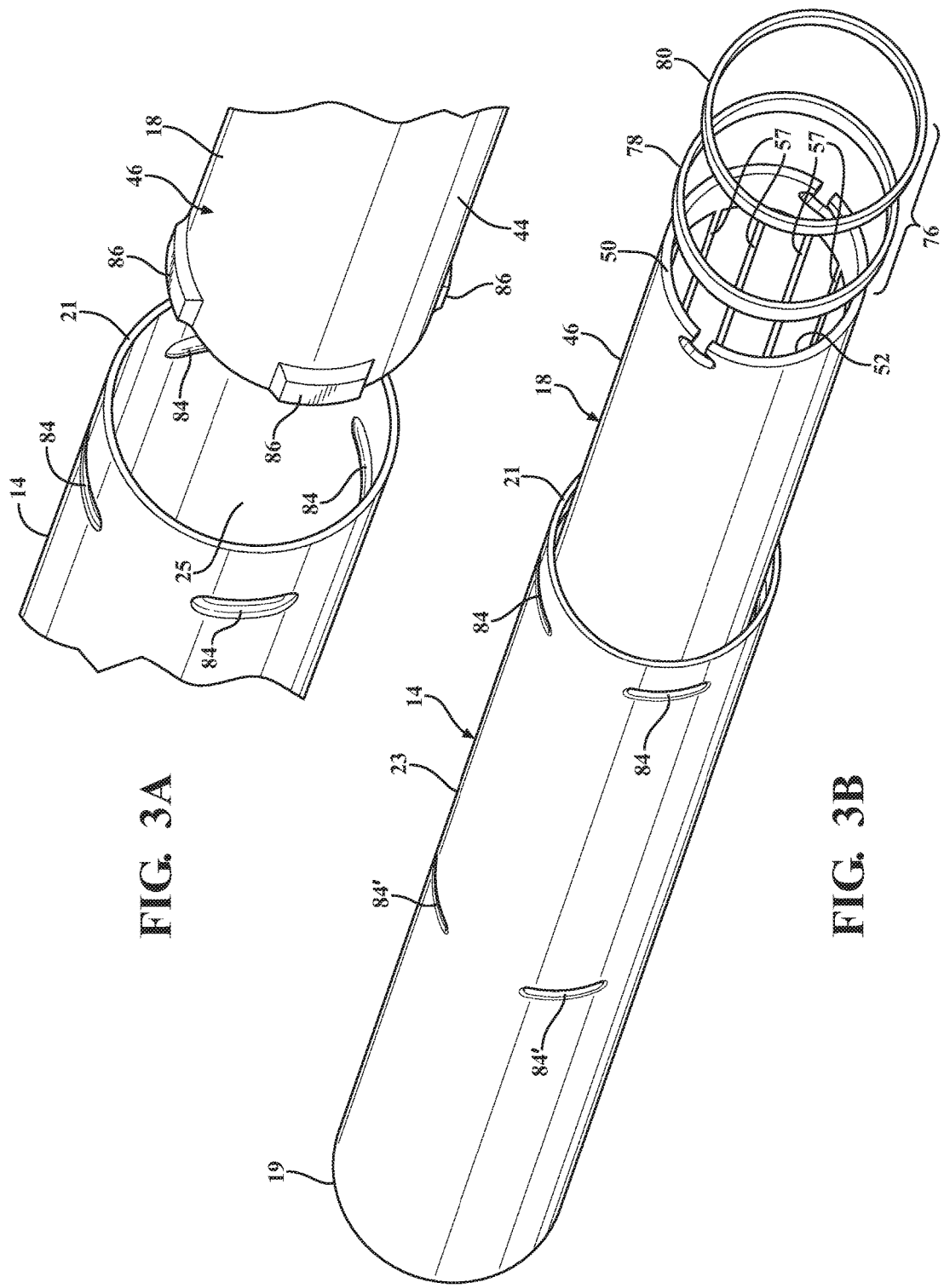
FIG. 3A is an enlarged exploded partial view of a housing and an outer cover tube of an extensible member of the electromechanical strut of FIG. 2.
FIG. 3B is an enlarged partially assembled view of the housing and outer cover tube of FIG. 3A with a seal and bushing shown exploded therefrom.
Figure 3C:
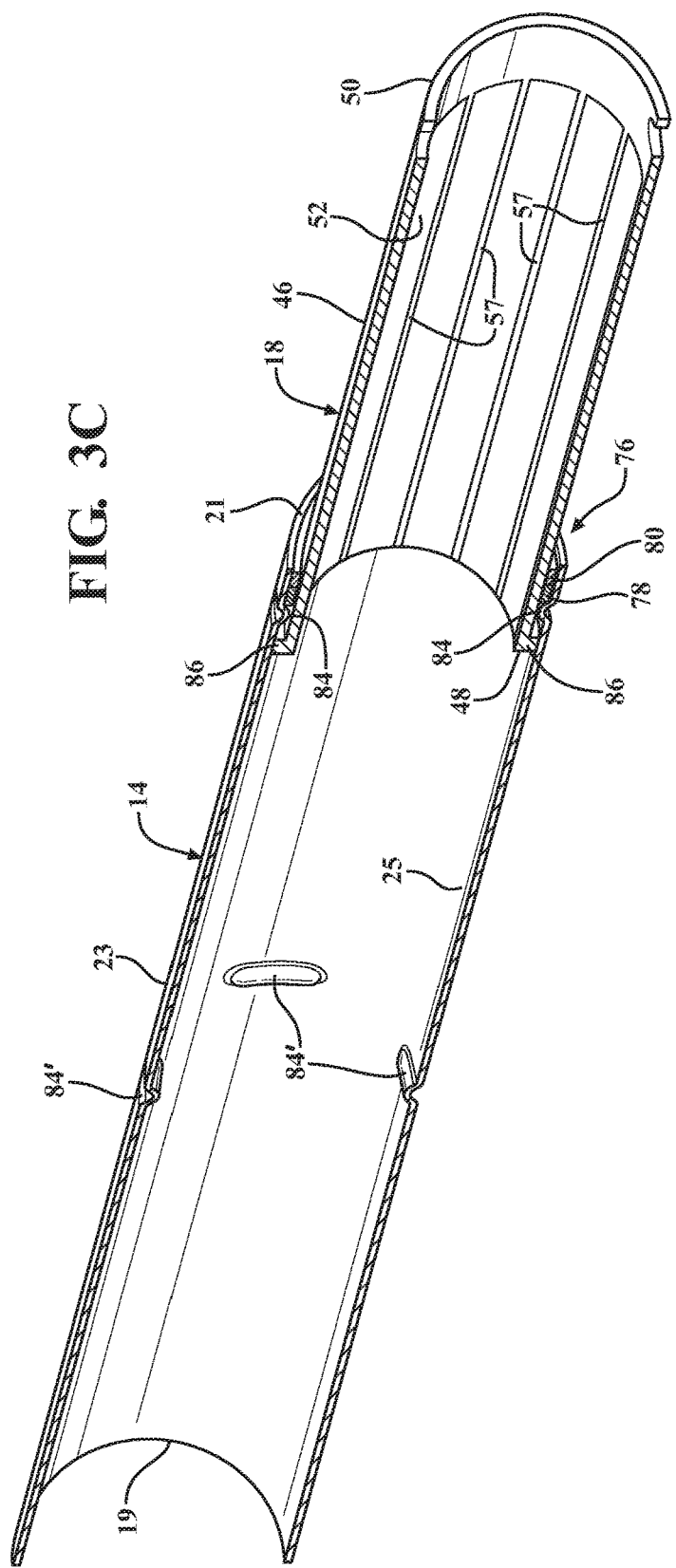
FIG. 3C is an enlarged cross-sectional view of the housing and outer cover tube of FIG. 3B with the seal and bushing shown disposed therebetween.
Figure 5:
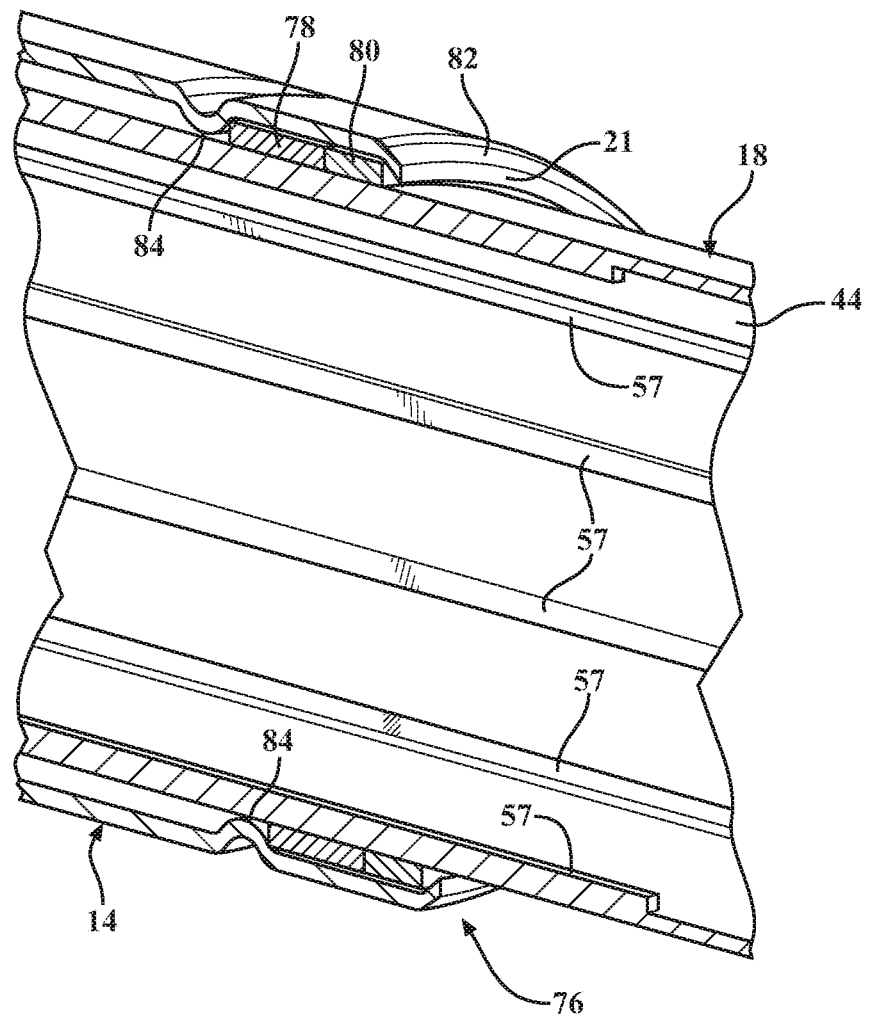
FIG. 5 is an enlarged isometric view of the encircled area 5 of FIG. 2.

During assembly, with or without the bushing/seal assembly 76 disposed on the cover tube 18, the outer cover tube 18 is inserted into the second end 21 of the housing 14 (FIG. 3B) and then the bushing 78 is inserted against the first ribs 84 with the seal 80 inserted to abut the bushing 78 (FIG. 3C), and then the second end 21 of the housing is spin or roll formed inwardly to form the tapered feature 82 that captures the busing/seal assembly 76 in its axially confined position between the first ribs 84 and the radially inwardly extending feature 82 (best shown in FIGS. 4B, 5).

To further yet inhibit lateral movement between the housing 14 and the outer cover tube 18, the outer cover tube 18 has at least one lateral support feature in the form of a protrusion 86 extending radially outwardly from the outer surface 46 of the outer cover tube 18. The at least one protrusion 86 is preferably provided as a plurality of protrusions 86 extending substantially coplanar with one another along a plane extending transversely to the central axis 64, with the protrusions 86 being spaced equidistantly from one another about the circumference of the outer surface 46, wherein four protrusions 86 are shown, and thus, being spaced about 90 degrees from one another. The protrusions 86 extend radially outwardly into close proximity or abutment with the inner surface 25 of the housing 14, and can engage the inner surface 25, such as in a line-to-line or slight interference fit, to inhibit lateral play between the housing 14 and the outer cover tube 18. Accordingly, the protrusions 86 extend radially outwardly beyond inner surfaces of both the first and second ribs 84, 84', and thus, the protrusions 86 and ribs 84, 84' having portions that extend radially beyond each other. The protrusions 86 are shown as being immediately adjacent the first end 48 of the cover tube 18, though it is contemplated herein that they could be located in other locations, in addition to or in lieu of the position shown. The protrusions 86 are sized widthwise (circumferentially extending width) to slide axially between the first and second ribs 84, 84', and thus, can be readily indexed and slid between the first and second ribs 84, 84' during assembly and during use, as needed. The protrusions 86 are preferably formed as a monolithic piece with the outer cover tube 18, such as in a molding process, wherein the outer cover tube 18 is formed of a molded polymeric material, by way of example and without limitation. It should be recognized that the outer cover tube 18 could be formed of a metallic material, if desire, and that the protrusions 86 could be integrally formed in the metal material, or fastened thereto as separate members of a different material, if desired, such as polymeric members formed of an adhesive plastic strip, by way of example and without limitation.

In powered operation, torque provided by motor 30 is transferred via gearset 32 to power screw 34 for causing linear motion of extensible member 40, as described above. For manual operation, motor 30 and planetary gearset 32 are back driven. The friction in the system due to the direct engagement of motor 30 and planetary gearset 32 with power screw 34 allows the lift gate 24 to remain still in any intermediate position between the open and closed positions. Electromechanical strut 10 thus provides stable intermediate positions for the lift gate 24 (useful, for example, for garages with low ceilings) without power consumption by using the internal friction of motor-gear assembly 28.

It is appreciated that a ball screw assembly, as known in the art, could be used in lieu of tubular nut shaft assembly 42. Also, although reference has been made specifically to a lift gate, it is also appreciated that the invention may be applied to a variety of other closure panels such as trunks or deck lids.

The above-described embodiments of the invention are intended to be examples of the present invention and alterations and modifications may be effected thereto, by those of skill in the art, without departing from the spirit of the invention.

What is claimed is:

1. An electromechanical strut for moving a closure member between an open position and a closed position relative to a motor vehicle body, the electromechanical strut comprising:

a housing operably connected to one of the closure member and motor vehicle body, said housing having a tubular wall with an inner surface bounding a cavity extending along a central axis between opposite first and second ends;

a motor disposed in said cavity of said housing adjacent said first end;

a power screw disposed in said cavity;

a motor gear-assembly operably connecting said motor to said power screw for operable rotation of said power screw;

an extensible member operably connected to the other of the pivotal closure member and the motor vehicle body, said extensible member having an outer cover tube at least partially received in said cavity through said second end of said housing and having a drive mechanism for converting rotary motion of said power screw into linear motion of said extensible member to move said extensible member between a retracted position and an extended position relative to said housing;

an annular gap defined between said inner surface of said housing and an outer surface of said outer cover tube;

an annular bushing disposed within said annular gap, said annular bushing maintaining said gap and minimizing lateral play between said housing and said outer cover tube;

at least one feature extending radially inwardly from said tubular wall toward said central axis proximate said second end of said housing and at least one rib extending radially inwardly from said tubular wall toward said central axis, said annular bushing positioned axially between and adjacent to said at least one feature and said at least one rib such that substantial axial movement of said annular bushing is inhibited; and at least one protrusion extending radially outwardly from said outer surface of said outer cover tube, said at least one protrusion being configured in a close fit with said inner surface of said tubular wall of said housing to inhibit lateral play between said housing and said outer cover tube, wherein said at least one protrusion includes a plurality of protrusions spaced circumferentially from one another.

2. The electromechanical strut of claim 1, further including an annular seal disposed within said annular gap axially between and adjacent to said at least one feature and said annular bushing such that axial movement of said annular seal is substantially inhibited by said at least one feature and said annular bushing.

3. The electromechanical strut of claim 2, wherein said annular bushing and said annular seal are formed of different materials.

4. The electromechanical strut of claim 3, wherein said annular bushing is a lubricious polymeric material.

5. The electromechanical strut of claim 4, wherein said annular seal is an elastomeric material.

6. The electromechanical strut of claim 3, wherein said annular seal is an elastomeric material.

7. The electromechanical strut of claim 1, wherein said at least one feature is formed by a radially inwardly tapered region of said second end.

8. The electromechanical strut of claim 1, wherein said at least one rib is formed by a plastically deformed indentation in said tubular wall of said housing.

9. The electromechanical strut of claim 1, wherein said at least one protrusion is formed as a monolithic piece of material with said outer cover tube.

10. The electromechanical strut of claim 9, wherein said at least one protrusion is molded as a monolithic piece of polymeric material with said outer cover tube.

11. The electromechanical strut of claim 1, wherein said plurality of protrusions are substantially coplanar along a plane extending generally transversely to said central axis.

12. The electromechanical strut of claim 1, wherein said at least one rib includes a plurality of ribs spaced circumferentially from one another, said plurality of protrusions and said plurality of ribs being configured to slide past one another.

13. The electromechanical strut of claim 12, wherein said plurality of ribs are substantially coplanar along a plane extending generally transversely to said central axis.

14. The electromechanical strut of claim 13, wherein said plurality of protrusions are substantially coplanar along a plane extending generally transversely to said central axis.

15. The electromechanical strut of claim 12, wherein said plurality of protrusions and said plurality of ribs extend radially beyond one another.

16. The electromechanical strut of claim 1, wherein said at least one rib includes a first plurality of ribs spaced circumferentially from one another in substantially coplanar relation and a second plurality of ribs spaced circumferentially from one another in substantially coplanar relation, said first plurality of ribs being spaced axially along said central axis from said second plurality of ribs, said at least one protrusion being configured to slide past said first and second plurality of ribs.

17. The electromechanical strut of claim 16, wherein said at least one protrusion includes a plurality of protrusions spaced circumferentially from one another, said plurality of protrusions extending radially beyond inner surfaces of said first and second plurality of ribs.

18. The electromechanical strut of claim 1, wherein said at least one rib is axially spaced from said at least one feature, and wherein said annular bushing is positioned adjacent to said at least one rib.

19. An electromechanical strut for moving a closure member between an open position and a closed position relative to a motor vehicle body, the electromechanical strut comprising:

a housing operably connected to one of the closure member and motor vehicle body, said housing having a tubular wall with an inner surface bounding a cavity extending along a central axis between opposite first and second ends;

a motor disposed in said cavity of said housing adjacent said first end;

a power screw disposed in said cavity;

a motor gear-assembly operably connecting said motor to said power screw for operable rotation of said power screw;

an extensible member operably connected to the other of the pivotal closure member and the motor vehicle body, said extensible member having an outer cover tube at least partially received in said cavity through said second end of said housing and having a drive mechanism for converting rotary motion of said power screw into linear motion of said extensible member to move said extensible member between a retracted position and an extended position relative to said housing, wherein an annular gap is defined between said inner surface of said housing and an outer surface of said outer cover tube;

an annular bushing disposed within said annular gap, said annular bushing maintaining said annular gap and minimizing lateral play between said housing and said outer cover tube;

at least one feature extending radially inwardly from said tubular wall toward said central axis proximate said second end of said housing and at least one rib extending radially inwardly from said tubular wall toward said central axis, said annular bushing positioned axially between and adjacent to said at least one feature and said at least one rib such that substantial axial movement of said annular bushing is inhibited; and at least one protrusion extending radially outwardly from said outer surface of said outer cover tube, said at least one protrusion being configured in a close fit with said inner surface of said tubular wall of said housing to inhibit lateral play between said housing and said outer cover tube, wherein said at least one rib includes a first plurality of ribs spaced circumferentially from one another in substantially coplanar relation and a second plurality of ribs spaced circumferentially from one another in substantially coplanar relation, said first plurality of ribs being spaced axially along said central axis from said second plurality of ribs, said at least one protrusion being configured to slide past said first and second plurality of ribs.

20. The electromechanical strut of claim 19, wherein said at least one protrusion includes a plurality of protrusions spaced circumferentially from one another, said plurality of protrusions extending radially beyond inner surfaces of said first and second plurality of ribs.

\* \* \* \* \*